Feb. 26, 1929.
R. S. DE VON
1,703,613
FRICTION DRIVE FOR WATCHMAKERS' LATHES
Filed Aug. 15, 1927
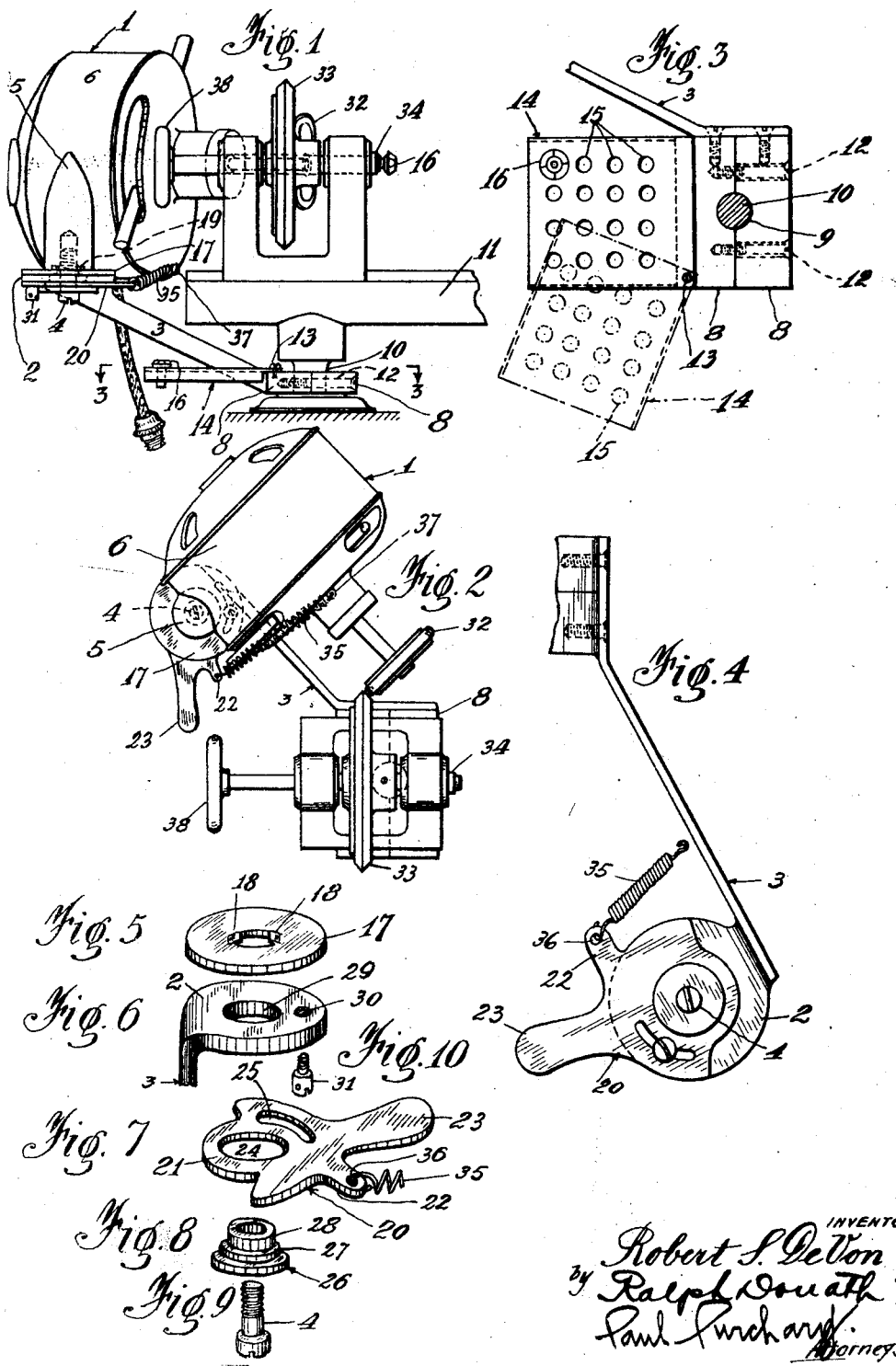
INVENTOR:
Robert S. DeVon
by Ralph Donath
Paul Purchard
Attorneys Patented Feb. 26, 1929.

UNITED STATES PATENT OFFICE.

ROBERT S. DE VON, OF PITTSBURGH, PENNSYLVANIA.

FRICTION DRIVE FOR WATCHMAKERS' LATHES.

Application filed August 15, 1927. Serial No. 212,967.

This invention relates to friction drives for power transmission and especially to such drives for operating watchmakers' lathes.

The primary object of this invention is to provide a friction drive for watchmakers' lathes which is easily adjusted and is adapted to be mounted on standard watchmakers' lathes without requiring any important modifications on the latter. Another object is to provide such a drive which is simple in construction and operation and which can be manufactured at relatively low cost. Additional features and advantages of this invention will appear in the course of the following description considered in connection with the accompanying drawing which forms a part of this application and in which:

Fig. 1 is a side elevation of a watchmaker's lathe, with a portion broken away, provided with a friction drive of my invention.

Fig. 2 is a top view of Fig. 1, with parts of the lathe omitted.

Fig 3 is a plan view of a section taken on line 3—3 in Fig. 1.

Fig. 4 is a bottom plan view of the adjusting mechanism and supporting bracket therefor.

Figs. 5 to 10 are perspective views of the various elements of the adjusting mechanism.

Reference being had to the drawing, it will be noted that the driving power for the lathe is obtained from a variable speed electric motor 1 which is rockably mounted upon the top-plate 2 of the bracket-arm 3 by means of a screw 4 which engages the motor supporting column 5 disposed subtantially tangent to the frame 6 of the electric motor. The bracket-arm is screwed, or otherwise secured, to both halves of the clamping-block 8 which has an aperture 9 that fits about the foot 10 of the lathe-stand 11. Screws 12 are shown for securing the clamping-block on said foot, for angular adjustment. The bracket-arm is preferably made of sheet metal of rectangular cross-section placed on edge so as to offer a certain amount of spring in the direction of rotation around the foot. Hinged to the clamping-block, by means of the screw 13, is the chuck-rack or plate 14 in which are drilled a quantity of apertures 15 which serve as receptacles for the various chuck 16, used in connection with the lathe. The purpose of hingedly mounting the chuck-plate is, of course, to place the latter out of the way of the watch-maker, when not in use.

The construction used for swivelly mounting the electric-motor on the bracket-arm 3 is best illustrated in Fig. 1 and detailed in Figs. 5 to 10. As shown therein, a washer 17, larger than the column 5, is interposed between the latter and the top-plate 2 of the bracket to increase the bearing area and, therefore, reduce the wear due to friction. This washer has two or more up-turned lugs 18 which engage suitable notches or slots 19 cut in the base of the column, to cause said washer to rotate with the motor on the top-plate. On the underside of the lattter is placed the tension-lever 20 which, as shown in Fig. 7 in particular, comprises a body-portion 21, the spring-anchoring lug 22 and the lever-handle 23. In the body-portion are provided the cylindrical aperture 24 and the concentric arcuate slot 25. The motor and the just described parts are held on the top-plate 2 by means of the screw 4 which is inserted through a flanged bushing member 26 having two stepped off collars 27 and 28, the former fitting in the aperture 24 and the latter engaging the aperture 29 provided in the top-plate. In the latter is also the threaded hole 30 for the locking-screw 31, the shank of which engages the slot 25 and whereby the tension-lever 20 may be locked, within limits, in any desired angular position, relative to the bracket-arm 3.

Upon the motor-shaft is secured the driving pulley 32 which is preferably made of rubber or other material having a high coefficient of friction. This driving-pulley may frictionally engage the periphery of the driven pulley 33 which is mounted on the chuck-arbor 34 of the lathe. The necessary pressure of the driving pulley on the driven pulley is obtained by means of the coil-spring 35 one end of which is hooked into an aperture 36 provided in the anchoring-lug 22 whereas the other end is attached to the motor-frame by means of a screw 37.

To operate the lathe by the motor, the watchmaker rotates the latter on the base-plate 2 until the driving pulley 32 comes in contact with the driven pulley 33; then, by turning the tension-lever 20 in the right direction, the required pressure on the driven pulley is obtained by stretching the spring 35. This done, the tension-lever is locked into position by tightening the locking-screw 31. If the watchmaker wishes to operate the lathe by hand, (by means of the hand-wheel 38) he loosens up the screw 31 and turns the motor around so that the driving pulley will leave the driven pulley, as will be understood.

While I have illustrated and described herein the present embodiment of my invention, and one which I have found by actual use to be very practical, it may be found desirable after continued experience to make slight changes in the construction and arrangement of the details of my invention, and I intend to include in this application all such changes, as fall within the scope of the appended claims.

I claim:

1. The combination with a watchmaker's lathe having a pulley to be driven and a supporting foot of the character described, of an electric motor having a driving pulley; a bracket for said motor; means for securing said bracket to said foot for angular adjustment thereon in a horizontal plane; means for rockably mounting said motor on said bracket, and means for yieldingly holding the driving pulley in engagement with said driven pulley, said last mentioned means comprising a tension-lever fulcrumed on said bracket and a spring-member having one of its ends attached to said lever and the other end attached to the frame of said motor.

2. The combination with a watchmaker's lathe having a pulley to be driven and a supporting foot of the character described, of an electric motor having a driving pulley; a bracket for said motor; means for securing said bracket to said foot for angular adjustment thereon in a horizontal plane; means for rockably mounting said motor on said bracket, and means for yieldingly holding the driving pulley in engagement with said driven pulley, said last mentioned means comprising a tension-lever fulcrumed on said bracket and a spring-member having one of its ends attached to said lever and the other end attached to the frame of said motor, and means for locking said lever into adjusted position.

In testimony whereof I affix my signature.

ROBERT S. DE VON.